US 6,580,570 B2

(12) United States Patent
Becker et al.

(10) Patent No.: US 6,580,570 B2
(45) Date of Patent: Jun. 17, 2003

(54) MOUNTING APPARATUS FOR AN OPTICAL ELEMENT

(75) Inventors: Jochen Becker, Oberkochen (DE); Bernhard Gellrich, Aalen (DE); Werner Lang, Geislingen (DE); Alexander Kohl, Aalen (DE); Sascha Kraus, Aalen (DE)

(73) Assignee: Carl-Zeiss-Stiftung (DE)

( * ) Notice: Subject to any disclaimer, the term of this patent is extended or adjusted under 35 U.S.C. 154(b) by 42 days.

(21) Appl. No.: 10/002,097

(22) Filed: Oct. 18, 2001

(65) Prior Publication Data

US 2002/0085292 A1 Jul. 4, 2002

(30) Foreign Application Priority Data

Oct. 18, 2000  (DE) .......................... 100 51 706

(51) Int. Cl.⁷ ................................. G02B 7/02
(52) U.S. Cl. ...................... 359/819; 359/830
(58) Field of Search ................ 359/819, 822, 359/824, 830, 811, 823, 825, 827, 694; 353/100; 362/455; 396/526

(56) References Cited

U.S. PATENT DOCUMENTS 3,917,385 A    11/1975  Caswell ...................... 359/822
6,275,344 B1 *  8/2001  Holderer ..................... 359/822
6,307,688 B1 * 10/2001  Merz et al. .................. 359/819
2002/0001142 A1 *  1/2002  Osterried .................... 359/819
2002/0021504 A1 *  2/2002  Bayer et al. ................. 359/827

FOREIGN PATENT DOCUMENTS

DE    199 08 554.4    3/1999

* cited by examiner

Primary Examiner—Georgia Epps
Assistant Examiner—Gary O'Neill
(74) Attorney, Agent, or Firm—Wells St. John P.S.

(57) ABSTRACT

In the case of a mounting apparatus, an optical element having an inner mount and an outer mount, in particular a lens in a projection lens system for semiconductor lithography, the inner mount is connected to the outer mount via three circumferentially distributed solid-state articulations. Manipulators, by means of which the inner mount can be displaced, act on the solid-state articulations. The solid-state articulations are T-shaped in cross section with a T-bar and a T-support. Attachment points between the inner mount and the outer mount are located in each case in the region of the outer ends of the T-bar. The manipulators act on the T-support in each case.

42 Claims, 1 Drawing Sheet

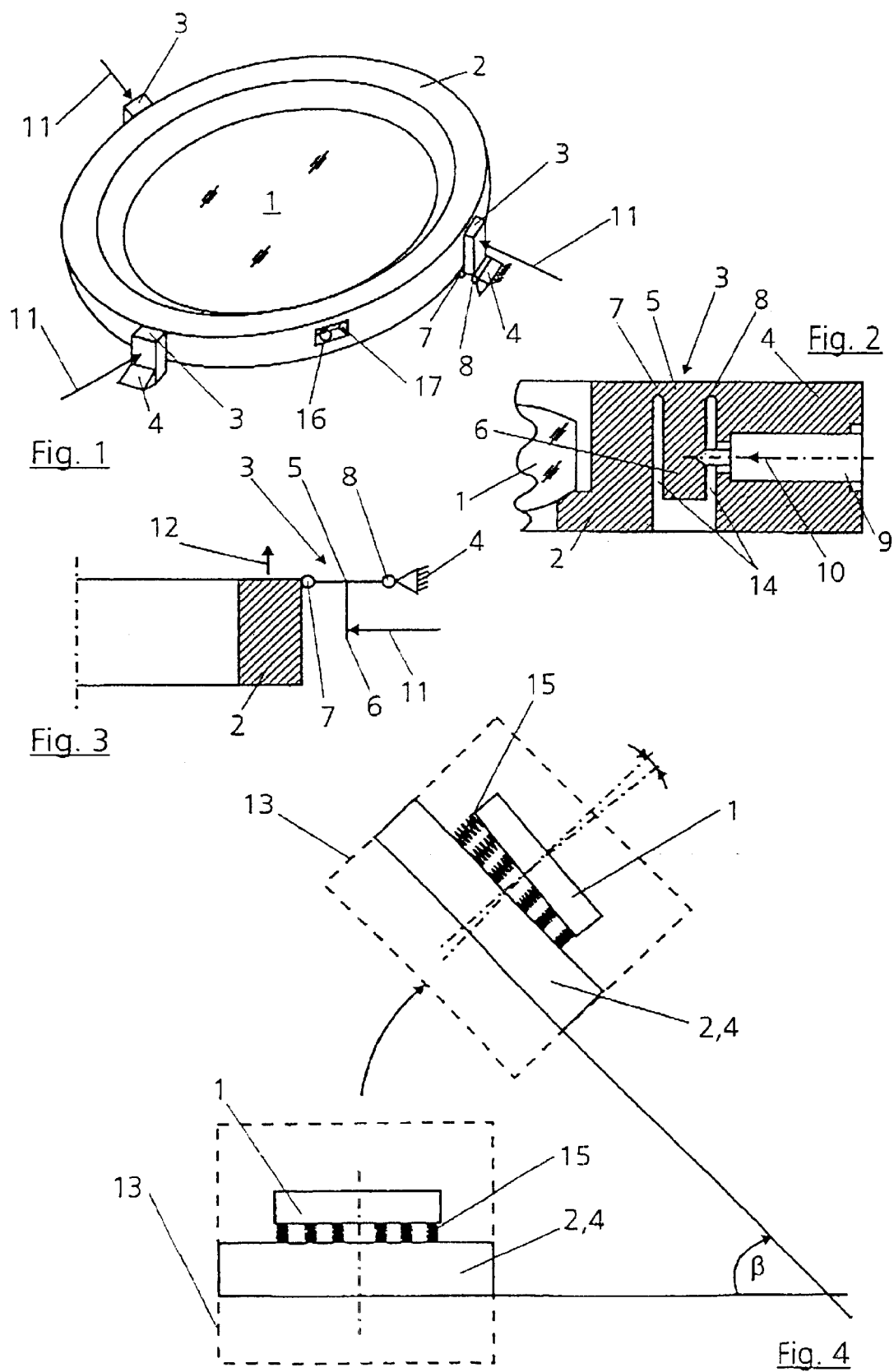

MOUNTING APPARATUS FOR AN OPTICAL ELEMENT

RELATED APPLICATIONS

This application relates to and claims priority to corresponding German Patent Application No. 100 51 706.4 filed on Oct. 18, 2000.

BACKGROUND OF THE INVENTION

The invention relates to a mounting apparatus for an optical element and more particularly to a mounting apparatus for mounting a lens.

Optical elements, e.g. lenses, have to be installed and adjusted very precisely in relation to their mechanical reference, in particular, in lens systems for semiconductor lithography. It is thus the case, e.g. with lenses, that the optical axis has to be made to coincide as precisely as possible with the ideal mechanical axis.

The applicant's earlier application P 199 08 554.4 dicloses a three-point mounting via solid-state rotary articulations with solid-state transitions which can be adjusted by manipulators. A three-point mounting is also known from U.S. Pat. No. 3,917,385.

SUMMARY OF THE INVENTION

The object of the present invention is to improve the hitherto known installation and adjustment mounting method by an integrated fine-tuning functional unit, in order to achieve higher positioning accuracy.

This object is achieved according to one aspect of the invention by a mounting apparatus for an optical element, having an inner mount and an outer mount, the inner mount being connected to the outer mount via three circumferentially distributed solid-state articulations, and manipulators, acting on the solid-state articulations, by means of which the inner mount can be displaced, wherein the solid-state articulations are T-shaped in cross section, with a T-bar and a T-support, attachment points between the inner mount and the outer mount being located in each case in the region of the outer ends of the T-bar, and the manipulators acting on the T-support in each case.

In particulary to a further aspect of the invention the mounting apparatus refers to an apparatus for mounting a lens in a projection lens system for semi-conductor lithography.

The mounted optical element is retained in a statically determined manner by the three circumferentially arranged attachment points. Adjustment at the T-shaped transitions of the solid-state articulations then makes it possible for the inner mount of the optical element to be locally lowered or raised on the circumference. If the T-supports are subjected to the same force and the same displacement direction at all three transitions, then the optical element is displaced along its optical axis (z axis). Different forces and/or displacements at the attachments can correct and/or adjust tilting of the optical axis.

A very advantageous design for mounting the optical element may reside in the fact that the inner mount, the outer mount and the solid-state articulations are formed in one piece, and are separated off from one another by severing cuts.

The severing cuts may be produced, for example, by erosion.

A very advantageous application area for the apparatus according to the invention is in lense systems in which optical elements, in their installed position, deviate from the axis of gravity, i.e. from the vertical. This is because, in this case, the optical element, on account of its dead weight, tends to tilt in relation to the mechanical reference, in particular in the case of flexible attachments. The apparatus according to the invention then makes it possible, by means of sensors which are accessible and/or installed, for example, from the outside, to establish the deviating position and then to adjust the optical element back into its original position again.

With a suitable design of, and accessibility to, the manipulators, which may have, for example, hydraulic, pneumatic, mechanical or electrical actuating members, it is also possible for the apparatus according to the invention to be utilized actively in the optical functional group, in order for it to be possible to adjust image errors which occur during operation.

BRIEF DESCRIPTION OF THE DRAWINGS

An exemplary embodiment of the invention is described in principle hereinbelow with reference to the drawing, in which:

FIG. 1 shows a basic perspective illustration of the three-point mounting with the solid-state articulations according to the invention;

FIG. 2 shows, in detail form, an enlarged illustration of a T-shaped solid-state articulation in section;

FIG. 3 snows a basic illustration of the action of forces for adjustment purposes; and FIG. 4 shows a basic illustration of an optical element in an installed position deviating from the axis of gravity.

DETAILED DESCRIPTION OF THE PREFERRED EMBODIMENT

According to the illustration in FIGS. 1 and 2, a lens 1 is mounted, as optical elements, in an inner mount 2, which is connected to an outer mount 4 via three circumferentially distributed solid-state articulations 3. For reasons of clarity, the outer mount 4 is only indicated at the attachment points in FIG. 1. FIG. 2 also shows a T-shaped solid-state articulation, the T-bar 5 being located on the top side and running horizontally, while the T-support 6 runs vertically. FIG. 1, in contrast, illustrates the reverse position. As can be seen, the solid-state articulations 3 only constitute a T-shape more or less or in principle, attachment points 7 and 8 between the inner mount 2 and the outer mount 4 being located in each case at the outer ends of the T-bar 5. A manipulator 9 (not illustrated any more specifically), which is mounted in the outer mount 4, acts in the region of the bottom end of each T-support 6. A lever arm 10 of the manipulator 9 subjects the T-support 6 to tensile and/or compressive forces here.

As car be seen from the illustration of forces from FIG. 3, a force to which the T-support 6 is subjected in the actuating direction 11 results, on account of the kinematics of the T-shape, in the inner mount 2 being displaced in arrow direction 12. It is thus possible for the inner mount 2 and thus also the lens 1 to be locally lowered or raised in each case at the corresponding attachment point, as a result of which the lens 1 is tilted correspondingly in relation to its optical axis. If all three solid-state articulations 3 are subjected to the same force and/or displacement, the lens 1 is displaced along its optical axis.

FIG. 4 shows a basic illustration of a lens which is installed in a lens system or lens-system part 13 (only illustrated in part by dashed lines) which, in the installed position or during subsequent use, deviates from the axis of gravity by the angle β. The lens 1 is mounted on a multiplicity of elastic feet 15 (not illustrated any more specifically) and thus provides a flexible attachment, which results in tilting, as is illustrated in the top view, namely in the oblique position. Activating the manipulator 9 or the corresponding manipulators 9 then makes it possible for this tilting to be eliminated and the lens 1 to be adjusted back into its original reference position again.

It can also be seen from FIG. 2 that the inner mount 2 and the outer mount 4 with the solid-state articulations 3 located therebetween are separated off from one another by severing cuts 14, with the result that the apparatus as a whole is of single-piece construction.

FIG. 1 merely illustrates in principle how position determination can be carried out, for example, by a capacitive sensor 16, which may be located in a recess 17 between the inner mount 2 and the outer mount 4. For this purpose, of course, it is necessary to have a plurality of capacitive sensors 16 correspondingly distributed over the circumference.

What is claimed is:

1. A mounting apparatus for an optical element, having an inner mount and an outer mount, the inner mount being connected to the outer mount via three circumferentially distributed solid-state articulations, and manipulators, acting on the solid-state articulations, by means of which the inner mount can be displaced, wherein the solid-state articulations are T-shaped in cross section, with a T-bar and a T-support, attachment points between the inner mount and the outer mount being located in each case in the region of the outer ends of the T-bar, and the manipulators acting on the T-support in each case.

2. The apparatus as claimed in claim 1, wherein the manipulators for the individual solid-state articulations can be actuated separately in each case.

3. The apparatus as claimed in claim 1, wherein the manipulators act on a bottom end of the T-support in each case.

4. The apparatus as claimed in claim 1, wherein the inner mount, the outer mount and the solid-state articulations are formed in one piece, and are separated off from one another by severing cuts.

5. The apparatus as claimed in claim 1, wherein the solid-state articulations with the manipulators are also provided for correcting dead-weight errors of the optical elements in an installed position deviating from the axis of gravity.

6. The apparatus as claimed in claim 1, wherein sensors are provided for position determination of the inner mount.

7. The apparatus as claimed in claim 6, wherein the sensors are designed as capacitive sensors.

8. The apparatus as claimed in claim 1, wherein the manipulators provided are hydraulic or pneumatic actuating members.

9. The apparatus as claimed in claim 1, wherein the manipulators provided are mechanical actuating members.

10. The apparatus as claimed in claim 1, wherein the manipulators provided are electrical actuating members.

11. A mounting apparatus for mounting a lens in a projection lens system for semiconductor lithography, having an inner mount and an outer mount, the inner mount being connected to the outer mount via three circumferentially distributed solid-state articulations, and manipulators, acting on the solid-state articulations, by means of which the inner mount can be displaced, wherein the solid-state articulations are T-shaped in cross section with a T-bar and a T-support, attachment points between the inner mount and the outer mount being located in each case in the region of the outer ends of the T-bar, and the manipulators acting on the T-support in each case.

12. The apparatus as claimed in claim 11, wherein the manipulators for the individual solid-state articulations can be actuated separately in each case.

13. The apparatus as claimed in claim 11, wherein the manipulators act on a bottom end of the T-support in each case.

14. The apparatus as claimed in claim 11, wherein the inner mount, the outer mount and the solid-state articulations are formed in one piece, and are separated off from one another by severing cuts.

15. The apparatus as claimed in claim 11, wherein the solid-state articulations with the manipulators are also provided for correcting dead-weight errors of the lens in an installed position deviating from the axis of gravity.

16. The apparatus as claimed in claim 11, wherein sensors are provided for position determination of the inner mount.

17. The apparatus as claimed in claim 16, wherein the sensors are designed as capacitive sensors.

18. The apparatus as claimed in claim 11, wherein the manipulators provided are hydraulic or pneumatic actuating members.

19. The apparatus as claimed in claim 11, wherein the manipulators provided are mechanical actuating members.

20. The apparatus as claimed in claim 11, wherein the manipulators provided are electrical actuating members.

21. A mounting apparatus for an optical element, comprising an outer mount, an inner mount arranged within said outer mount, said optical element being adapted to said inner mount, at least three solid state articulations circumferentially arranged around said inner mount and between said inner mount and said outer mount, wherein each of said at least three solid state articulations has a T-shaped cross section with a T-bar extending in a first direction and a T-suppport extending in a second direction perpendicular to said first direction, and comprising at least three manipulators, each manipulator acting on one of said T-supports of one of said at least three solid state articulations for a displacement of said inner mount with respect to said outer mount.

22. The mounting apparatus of claim 21, wherein said manipulators providing a direction of force which is perpendicular to said second direction.

23. The apparatus as claimed in claim 21, wherein the manipulators for the individual solid-state articulations can be actuated separately in each case.

24. The apparatus as claimed in claim 21, wherein the manipulators act on a bottom end of the T-support in each case.

25. The apparatus as claimed in claim 21, wherein the inner mount, the outer mount and the solid-state articulations are formed in one piece, and are separated off from one another by severing cuts.

26. The apparatus as claimed in claim 21, wherein the solid-state articulations with the manipulators are also provided for correcting dead-weight errors of the optical elements in an installed position deviating from the axis of gravity.

27. The apparatus as claimed in claim 21, wherein sensors are provided for position determination of the inner mount.

28. The apparatus as claimed in claim 27, wherein the sensors are designed as capacitive sensors.

29. The apparatus as claimed in claim 21, wherein the manipulators provided are hydraulic or pneumatic actuating members.

30. The apparatus as claimed in claim 21, wherein the manipulators provided are mechanical actuating members.

31. The apparatus as claimed in claim 21, wherein the manipulators provided are electrical actuating members.

32. A mounting apparatus for mounting a lens in a projection lens system for semiconductor lithography, comprising an outer mount, an inner mount arranged within said outer mount, said optical element being adapted to said inner mount, at least three solid state articulations circumferentially arranged around said inner mount and between said inner mount and said outer mount, wherein each of said at least three solid state articulations has a T-shaped cross section with a T-bar extending in a first direction and a T-support extending in a second direction perpendicular to said first direction, and comprising at least three manipulators, each manipulator acting on a T-support of one of said at least three solid state articulations for a displacement of said inner mount with respect to said outer mount.

33. The mounting apparatus of claim 32, wherein said manipulators providing a direction of force which is perpendicular to said second direction.

34. The apparatus as claimed in claim 32, wherein the manipulators for the individual solid-state articulations can be actuated separately in each case.

35. The apparatus as claimed in claim 32, wherein the manipulators act on a bottom end of the T-support in each case.

36. The apparatus as claimed in claim 32, wherein the inner mount, the outer mount and the solid-state articulations are formed in one piece, and are separated off from one another by severing cuts.

37. The apparatus as claimed in claim 32, wherein the solid-state articulations with the manipulators are also provided for correcting dead-weight errors of the optical elements in an installed position deviating from the axis of gravity.

38. The apparatus as claimed in claim 32, wherein sensors are provided for position determination of the inner mount.

39. The apparatus as claimed in claim 38, wherein the sensors are designed as capacitive sensors.

40. The apparatus as claimed in claim 32, wherein the manipulators provided are hydraulic or pneumatic actuating members.

41. The apparatus as claimed in claim 32, wherein the manipulators provided are mechanical actuating members.

42. The apparatus as claimed in claim 32, wherein the manipulators provided are electrical actuating members.

* * * * *

UNITED STATES PATENT AND TRADEMARK OFFICE
CERTIFICATE OF CORRECTION

PATENT NO. : 6,580,570 B2
DATED : June 17, 2003
INVENTOR(S) : Jochen Becker et al.

It is certified that error appears in the above-identified patent and that said Letters Patent is hereby corrected as shown below:

Column 1,
Line 22, replace "dicloses a three-point mounting via solid-state rotary" with -- discloses a three-point mounting via solid-state rotary --
Line 45, replace "In particulary to a further aspect of the invention the" with -- In particular to a further aspect of the invention the --

Column 2,
Line 2, replace "according to the invention is in lense systems in which" with -- according to the invention is in lens systems in which --
Line 31, replace "FIG. 3 snows a basic illustration of the action of forces for" with -- FIG. 3 shows a basic illustration of the action of forces for --
Line 40, replace "mounted, as optical elements, in an inner mount 2, which is" with -- mounted, as optical element, in an inner mount 2, which is --
Line 57, replace "As car be seen from the illustration of forces from FIG. 3," with -- As can be seen from the illustration of forces from FIG. 3, --

Column 4,
Line 35, replace "mount, at least three solid state articulations" with -- mount, at least three solid-state articulations --
Line 38, replace "least three solid state articulations has a T-shaped cross" with -- least three solid -state articulations has a T-shaped cross --
Line 43, replace "T-supports of one of said at least three solid state" with -- T-supports of one of said at least three solid-state --

UNITED STATES PATENT AND TRADEMARK OFFICE
CERTIFICATE OF CORRECTION

PATENT NO. : 6,580,570 B2
DATED : June 17, 2003
INVENTOR(S) : Jochen Becker et al.

It is certified that error appears in the above-identified patent and that said Letters Patent is hereby corrected as shown below:

<u>Column 5,</u>
Line 12, replace "mount, at least three solid state articulations" with -- mount, at least three solid-state articulations --
Line 15, replace "least three solid state articulations has a T-shaped cross" with -- least three solid-state articulations has a T-shaped cross --
Line 20, replace "of said at least three solid state articulations for a" with -- of said at least three solid-state articulations for a --

Signed and Sealed this

Twenty-second Day of March, 2005

JON W. DUDAS
*Director of the United States Patent and Trademark Office*